(12) United States Patent
Hidaka et al.

(10) Patent No.: US 10,161,743 B2
(45) Date of Patent: Dec. 25, 2018

(54) MEASURING PROBE AND MEASURING PROBE SYSTEM

(71) Applicant: MITUTOYO CORPORATION, Kanagawa (JP)

(72) Inventors: Kazuhiko Hidaka, Tokyo (JP); Sadayuki Matsumiya, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 15/460,994

(22) Filed: Mar. 16, 2017

(65) Prior Publication Data

US 2017/0284794 A1    Oct. 5, 2017

(30) Foreign Application Priority Data

Apr. 4, 2016    (JP) .................................. 2016-075420

(51) Int. Cl.
*G01B 11/24*    (2006.01)

(52) U.S. Cl.
CPC ...... *G01B 11/2441* (2013.01); *G01B 11/2425* (2013.01)

(58) Field of Classification Search
None
See application file for complete search history.

(56) References Cited

U.S. PATENT DOCUMENTS

| 9,863,756 | B1* | 1/2018 | Li | G01B 11/0608 |
| 2010/0097619 | A1* | 4/2010 | Ge | G01B 11/2441 |
| | | | | 356/511 |
| 2016/0102968 | A1* | 4/2016 | Wu | G01B 11/16 |
| | | | | 356/32 |
| 2017/0176177 | A1* | 6/2017 | Takesue | G01B 11/24 |

FOREIGN PATENT DOCUMENTS

JP        2010-002392        1/2010

* cited by examiner

*Primary Examiner* — Shawn Decenzo
(74) *Attorney, Agent, or Firm* — Greenblum & Bernstein, P.L.C.

(57) ABSTRACT

A measuring probe for measuring a screw groove of a relatively movable ball screw includes a light source, an objective lens formed to correspond to the screw groove of the ball screw, arranged to be opposed to the screw groove of the ball screw in a non-contact manner, and configured to emit light from the light source to the screw groove of the ball screw, and a line sensor configured to detect an interference pattern generated by reflected light from the screw groove of the ball screw and reflected light on a surface of the objective lens. This enables high-accuracy measurement of a specified area of a shape of a side surface of a relatively movable work in a non-contact manner.

6 Claims, 8 Drawing Sheets

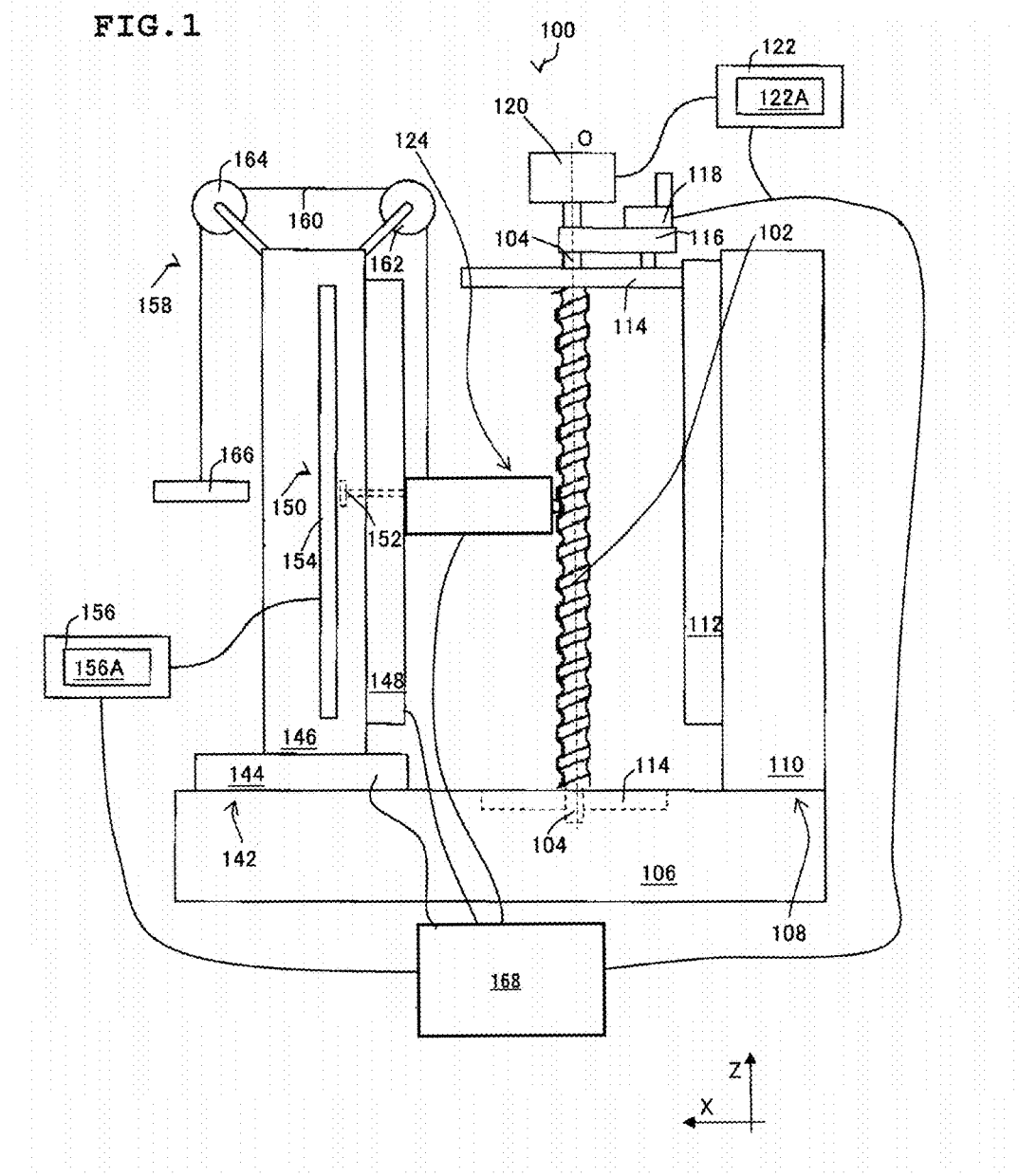

FIG.4A    FIG.4B    FIG.4C    FIG.4D
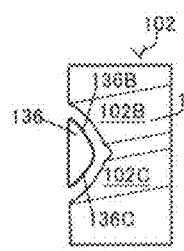
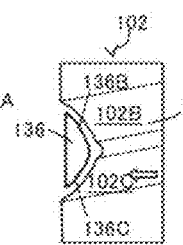
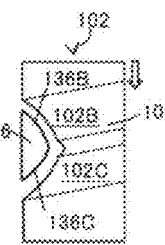
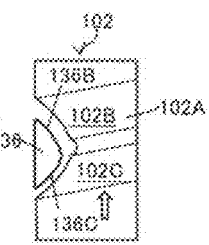
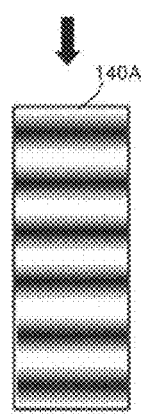
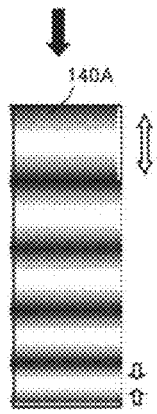
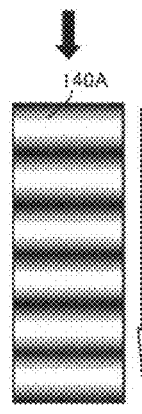
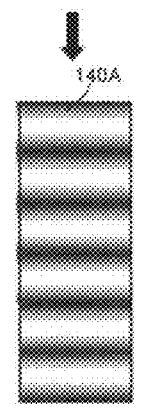
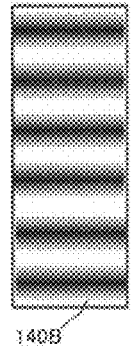
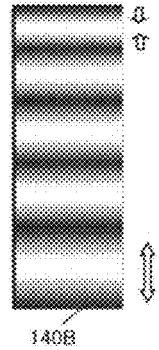
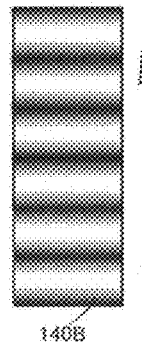
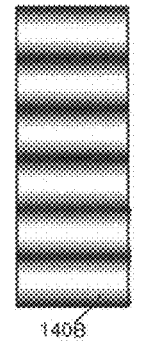

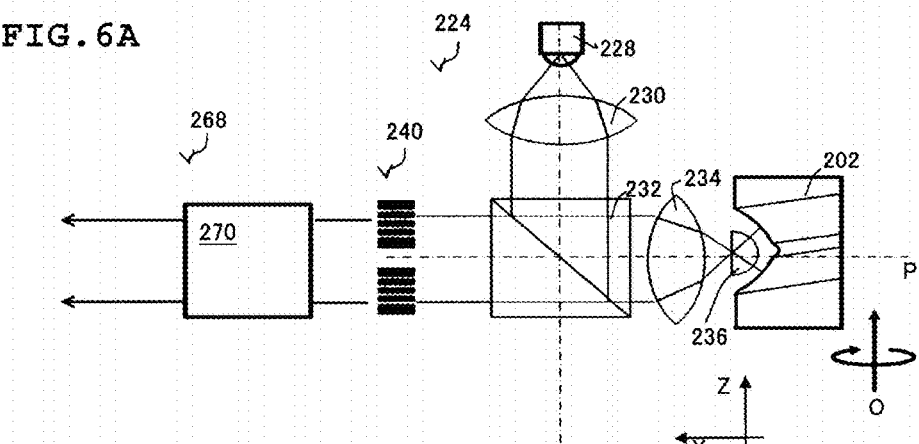
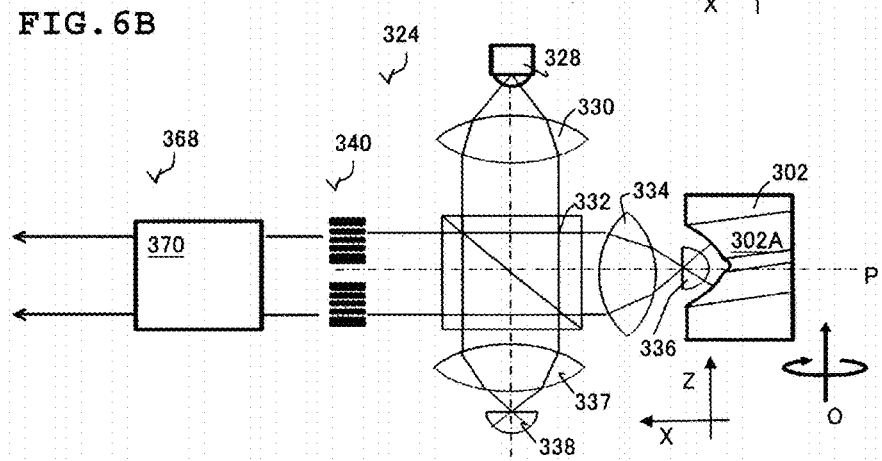
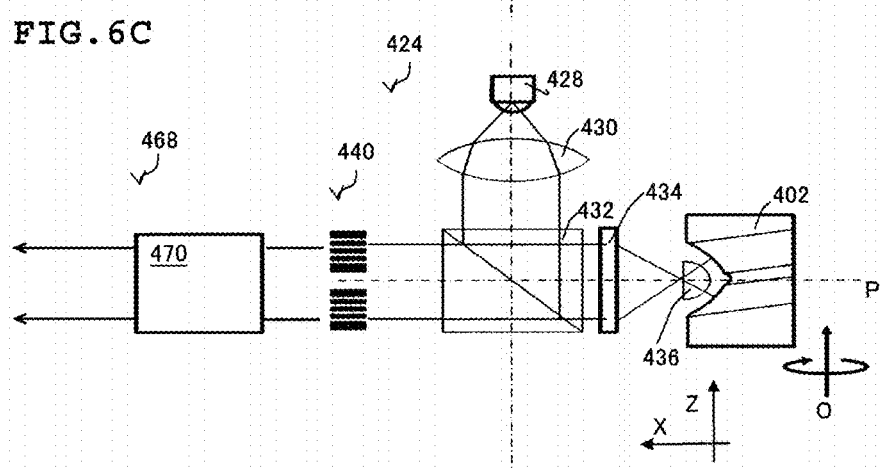

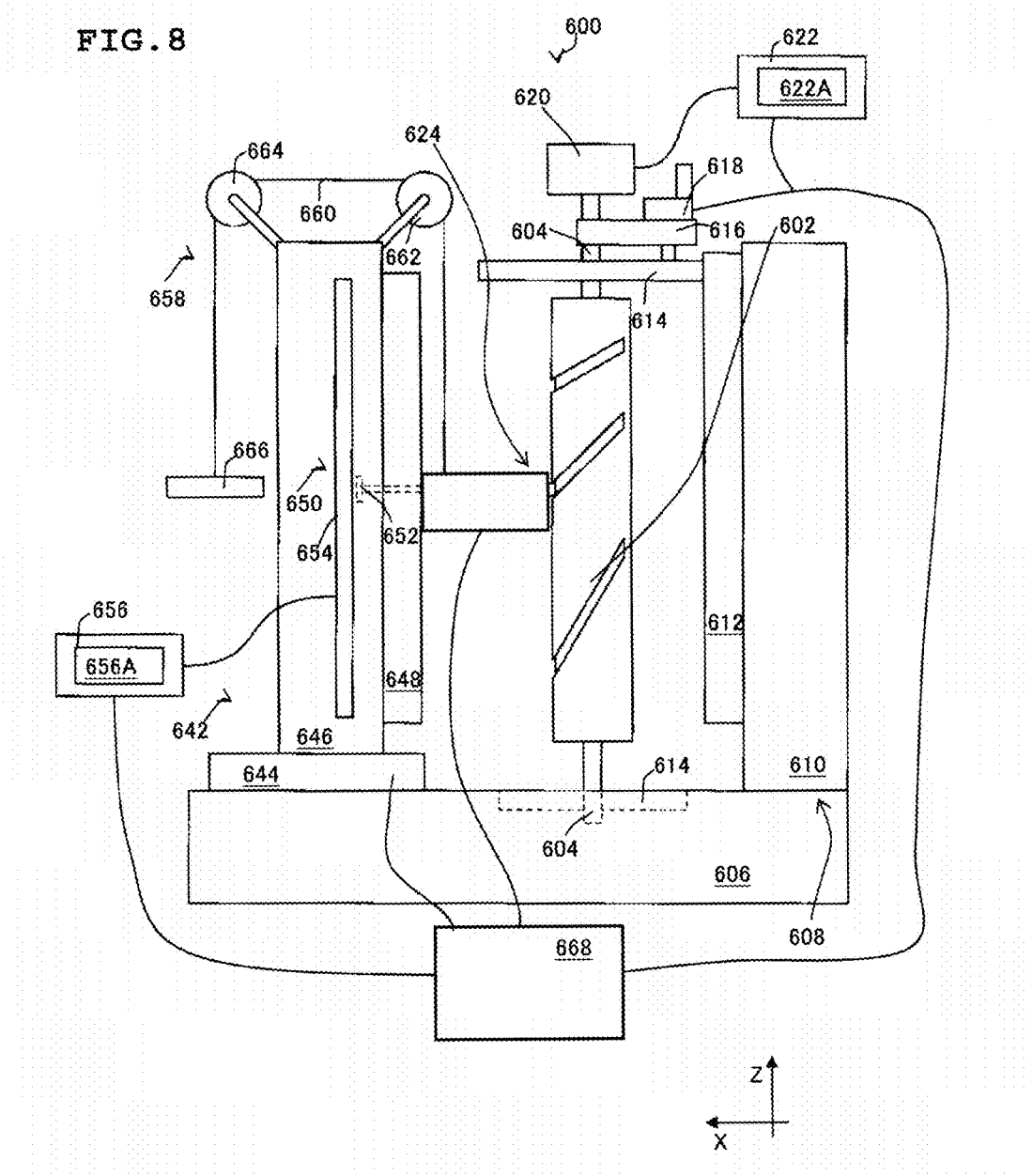

MEASURING PROBE AND MEASURING
PROBE SYSTEM

CROSS-REFERENCE TO RELATED
APPLICATION

The disclosure of Japanese Patent Application No. 2016-75420 filed on Apr. 4, 2016 including specifications, drawings and claims is incorporated herein by reference in its entirety.

TECHNICAL FIELD

The present invention relates to a measuring probe and a measuring probe system, and more specifically relates to a measuring probe and a measuring probe system enabling high-accuracy measurement of a specified area of a shape of a side surface of a relatively movable work in a non-contact manner.

BACKGROUND ART

Conventionally, a measuring probe described in JP 2010-2392 A is used. This measuring probe includes a contacting portion (stylus) to be inserted into a cam groove of a cylindrical cam. And the measuring probe is configured to measure a profile of the cylindrical cam, which is a side surface shape of a work, by making the stylus contact with upper and lower surfaces of the cam groove of the rotated cylindrical cam and moving the stylus upward and downward.

SUMMARY OF THE INVENTION

Technical Problem

However, since the stylus of the measuring probe described in JP 2010-2392 A is in the contact type, only a contact point contacting the stylus is reflected on the profile. That is, the stylus measures the contact "point" and cannot measure a shape of an "area." Also, since this stylus has a configuration in which movement thereof has only to be restricted on the upper and lower surfaces of the cam groove, it is difficult to clarify which of the upper and lower surfaces of the cam groove is reflected on the profile of the cylindrical cam.

The present invention has been made to solve the foregoing problems, and an object of the present invention is to provide a measuring probe and a measuring probe system enabling high-accuracy measurement of a specified area of a shape of a side surface of a relatively movable work in a non-contact manner.

Solution to Problem

The invention according to a first aspect of the present application solved the above problems by providing a measuring probe for measuring a side surface shape of a relatively movable work, including a light source, an objective lens formed to correspond to the shape of the side surface of the work, arranged to be opposed to the side surface of the work in a non-contact manner, and configured to emit light from the light source to the side surface of the work, and a sensor configured to detect an interference pattern generated by reflected light from the side surface of the work and reflected light on a surface of the objective lens.

In the invention according to a second aspect of the present application, the work is a rotating body and is rotatable relatively to the measuring probe.

In the invention according to a third aspect of the present application, the work is a ball screw, the side surface shape is a screw groove, and a cross-sectional shape of the objective lens is a shape where arcs of two circles overlap with each other.

In the invention according to a fourth aspect of the present application, the surface of the objective lens is formed in an arc along a screw groove center portion of the screw groove in a planar view.

In the invention according to a fifth aspect of the present application, the sensor is a line sensor including a plurality of detection elements only in one line in a rotation shaft direction of the work.

In the invention according to a sixth aspect of the present application, the measuring probe further includes a collimator lens configured to collimate light emitted from the light source, a beam splitter configured to reflect the collimated light passing through the collimator lens to the side surface of the work, and an optical element configured to condense the collimated light reflected on the beam splitter to emit light from the light source vertically in a direction towards the surface of the objective lens and the side surface of the work.

In the invention according to a seventh aspect of the present application, the measuring probe further includes an isolator configured to prevent reflection of light passing through both the collimator lens and the beam splitter, and light reflected on the sensor.

In the invention according to an eighth aspect of the present application, the measuring probe further includes a sliding member configured to contact the side surface of the work.

In the invention according to a ninth aspect of the present application, the sliding member has a pair of pieces, and the pieces are arranged to interpose the objective lens therebetween.

In the invention according to a tenth aspect of the present application, a measuring probe system including the measuring probe according to any one of the first to fourth aspects includes a signal processing device configured to analyze the interference pattern detected in the sensor and derive the shape of the side surface of the work.

According to the present invention, it is possible to measure a specified area of a shape of a side surface of a relatively movable work in a non-contact manner with high accuracy.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein;

FIG. 1 is a schematic diagram illustrating an example of a measuring probe system according to a first embodiment of the present invention;

FIG. 4A is a schematic diagram illustrating relationship between a position of a screw groove against the objective lens in FIGS. 2A and 2B and an interference pattern and illustrates a normal state, FIG. 4B is a schematic diagram illustrating relationship between the position of the screw groove against the objective lens in FIGS. 2A and 2B and an interference pattern and illustrates a state in which a diameter of the screw groove has changed, and each of FIGS. 4C and 4D is a schematic diagram illustrating relationship between the position of the screw groove against the objective lens in FIGS. 2A and 2B and an interference pattern and illustrates a state in which a lead pitch of the screw groove has changed;

FIG. 6A is a schematic diagram around a measuring probe according to a second embodiment of the present invention, FIG. 6B is a schematic diagram around a measuring probe according to a third embodiment of the present invention, and FIG. 6C is a schematic diagram around a measuring probe according to a fourth embodiment of the present invention;

FIG. 8 is a schematic diagram illustrating an example of a measuring probe system according to a sixth embodiment of the present invention.

DESCRIPTION OF EMBODIMENT

Figure 2A:
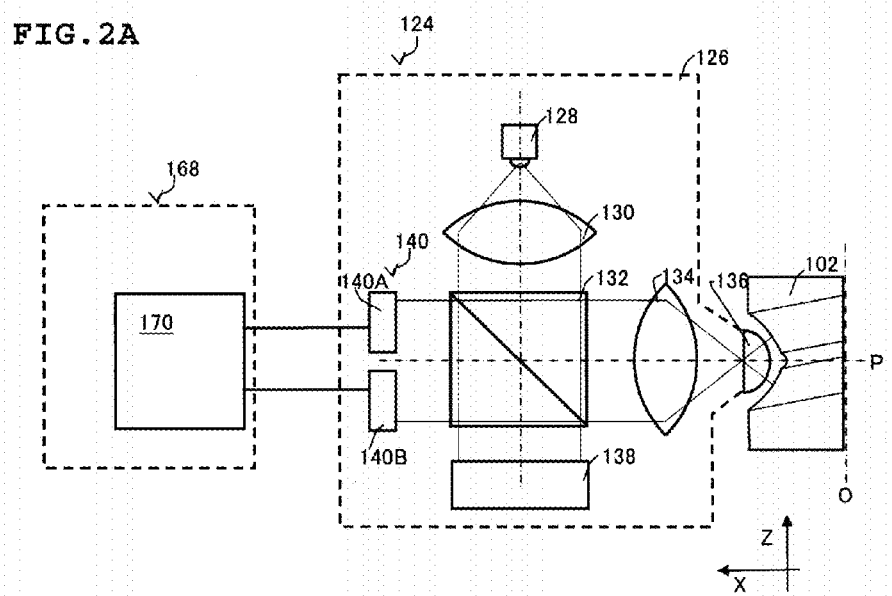
FIG. 2A is a side view around a measuring probe in FIG. 1.

Hereinbelow, an example of a first embodiment of the present invention will be described in detail with reference to FIGS. 1 to 5C.

First, an overview of a measuring probe system will be described.

A measuring probe system 100 includes a base 106, a rotation mechanism 108, a measuring probe 124, a probe support mechanism 142, and a signal processing device 168, as illustrated in FIG. 1.

Figure 3A:
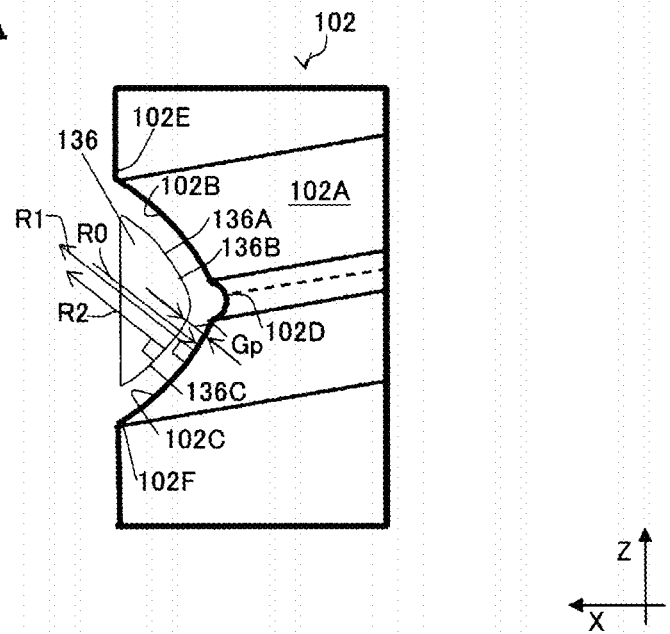
FIG. 3A is a side view illustrating positional relationship between an objective lens and a ball screw in FIGS. 2A and 2B.
Figure 5A:
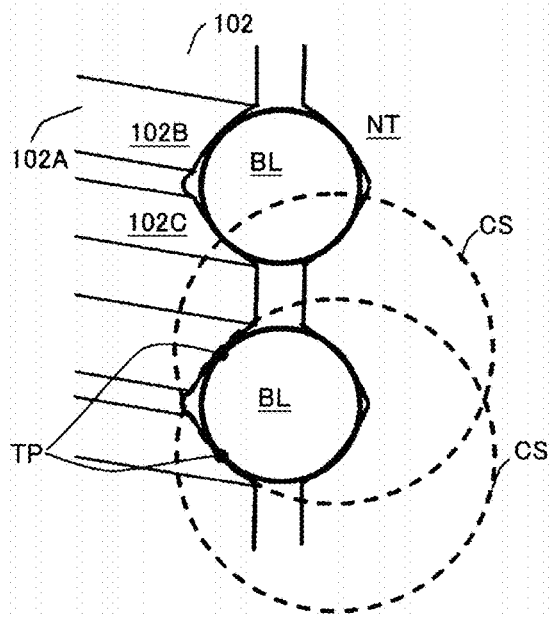
FIG. 5A illustrates shape errors of the screw groove and illustrates a Gothic arch shape of the screw groove and contact points.
Figure 5B:
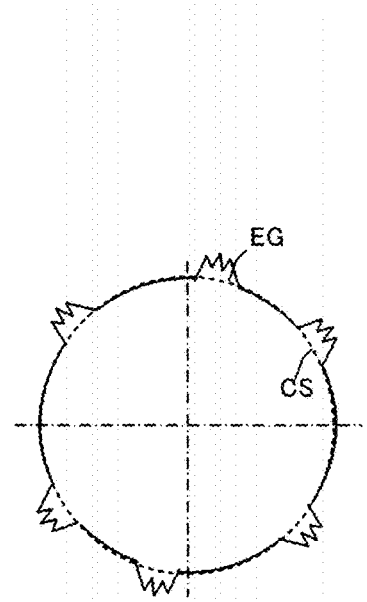
FIG. 5B illustrates the shape errors of the screw groove and illustrates groove diameter irregularities.
Figure 5C:
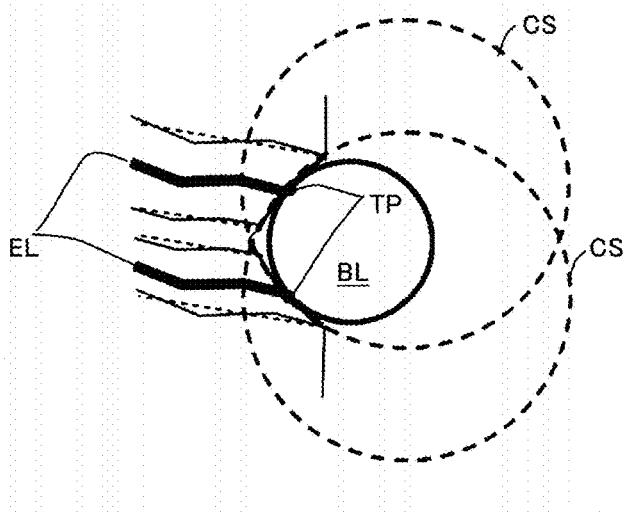
FIG. 5C illustrates the shape errors of the screw groove and illustrates lead irregularities.

In the present embodiment, a work to be measured is a ball screw 102 serving as a rotating body. The ball screw 102 is used to move a slider or the like (not illustrated) of a linear motion stage fixed to a nut NT via balls BL with high accuracy, as illustrated in FIG. 5A, for example. A spiral screw groove 102A (rolling movement surface of the ball BL) at regular lead pitches is provided on a side surface of the ball screw 102, as illustrated in FIGS. 3A and 5A (that is, a side surface shape of the work is the screw groove 102A). The cross-section of the screw groove 102A is formed in a Gothic arch shape where arcs of two circles CS (a cross-sectional shape of a screw groove upper surface 102B and a cross-sectional shape of a screw groove lower surface 102C) overlap with each other to facilitate adjustment of a space between the screw groove 102A and the ball BL, as illustrated in FIG. 5A, for example. The ball BL contacts the screw groove 102A at two contact points TP in total consisting of one contact point on the screw groove upper surface 102B and one contact point on the screw groove lower surface 102C. In the actual screw groove 102A, groove diameter irregularities EG occur on each of these circles CS, as illustrated in FIG. 5B, when the screw groove 102A is formed. Thus, the screw groove 102A causes corresponding lead irregularities EL (such as random walk of the contact point TP) to occur, as illustrated in FIG. 5C. Accordingly, in the ball screw 102, not only shape errors of a base material thereof (an outer diameter error, an axial center error, a roundness error, and the like) but also shape errors of the screw groove 102A (a lead pitch error, a lead irregularity, and the like) occur correspondingly.

The base 106 is a base supporting the rotation mechanism 108 and the probe support mechanism 142, as illustrated in FIG. 1. The base 106 supports the ball screw 102 as well.

The rotation mechanism 108 is a mechanism configured to rotate the ball screw 102, as illustrated in FIG. 1. The rotation mechanism 108 includes a column 110, a guide 112, a driving source (motor) 118, and a rotary encoder 120. The column 110 is provided to erect on the base 106 and supports the guide 112. The guide 112 supports one work support member 114 to enable the work support member 114 to approach to and separate from the other work support member 114 arranged directly in the base 106. The work support members 114 rotatably support the ball screw 102 via a rotation shaft 104. That is, by moving the work support member 114 supported to the guide 112, the two work support members 114 can rotatably support each of the ball screws 102 with various lengths.

As illustrated in FIG. 1, the rotation shaft 104 is detachably attached to the ball screw 102 and is driven to be rotated via a timing belt 116 by the driving source 118. Also, the rotation shaft 104 is directly connected to the rotary encoder 120 (the rotation shaft 104 may be fixed integrally with the ball screw 102). The rotary encoder 120 is connected to a display device 122. This enables a rotation angle of the ball screw 102 to be confirmed on a display unit 122A of the display device 122. The driving source 118 and the display device 122 are connected to the signal processing device 168.

The measuring probe 124 is arranged to be opposed to a side surface of the ball screw 102 and can measure the side surface shape (screw groove 102A) of the ball screw 102 that can be rotated by the rotation mechanism 108, as illustrated in FIG. 1. The measuring probe 124 will be described in detail below.

The probe support mechanism 142 is a mechanism configured to support the measuring probe 124 to enable the measuring probe 124 to be opposed to the side surface of the ball screw 102, as illustrated in FIG. 1. The probe support mechanism 142 includes an adjustment stage 144, a column 146, a Z stage 148, a linear encoder 150, and a balance mechanism 158. The adjustment stage 144 is movable in an X direction on the base 106 to position the measuring probe 124 with respect to the axial center O of the rotation shaft 104 (the adjustment stage 144 may be movable not only in the X direction but also in a Y direction perpendicular to the X direction). The column 146 is provided to erect on the adjustment stage 144 and supports the Z stage 148. The Z stage 148 supports the measuring probe 124 so as for the measuring probe 124 to be movable in a Z direction. The linear encoder 150 is provided in the column 146.

As illustrated in FIG. 1, the linear encoder 150 includes a detection head 152 and a linear scale 154. The detection head 152 is fixed to the measuring probe 124, and the linear scale 154 is fixed to the column 146. The linear encoder 150 is connected to a display device 156. This enables a position of the measuring probe 124 in the Z direction to be confirmed on a display unit 156A of the display device 156. As illustrated in FIG. 1, the adjustment stage 144, the Z stage 148, and the display device 156 are connected to the signal processing device 168.

As illustrated in FIG. 1, the balance mechanism 158 is a mechanism configured to achieve movement of the measuring probe 124 with a small force. That is, the balance mechanism 158 enables the Z stage 148 to move the measuring probe 124 with small torque. The balance mechanism 158 includes a wire 160, two pulleys 162 and 164, and a balancer 166. The wire 160 connects the balancer 166, which is approximately equivalent in weight to the measuring probe 124, to the measuring probe 124. The two pulleys 162 and 164 are rotatably fixed to the column 146 and movably support the wire 160. However, such a balance mechanism is not essential.

The signal processing device 168 is arranged outside the measuring probe 124 and includes a storage unit (not illustrated) configured to store various initial values, and a processing unit 170 (FIG. 2A) configured to read out the various initial values stored in the storage unit and to perform calculation, as illustrated in FIG. 1. Specifically, the processing unit 170 reads out design data of the ball screw 102 from the storage unit and derives coordinates representing the shape of the screw groove 102A. The processing unit 170 controls the driving source 118 and rotates the ball screw 102 based on the derived coordinates. The processing unit 170 also controls the probe support mechanism 142 and moves the measuring probe 124 in the Z direction (and the X direction). The processing unit 170 correlates a rotation angle of the ball screw 102 with a position of the measuring probe 124 in the Z direction and processes an output signal of the measuring probe 124. The signal processing device 168 is connected to input devices (not illustrated) such as a keyboard and a mouse, and the input devices enable input of instructions, setting of initial values, and selection and determination of processing procedures in an appropriate manner.

Next, the measuring probe 124 will be described in detail mainly with reference to FIGS. 2A and 2B.

Figure 2B:
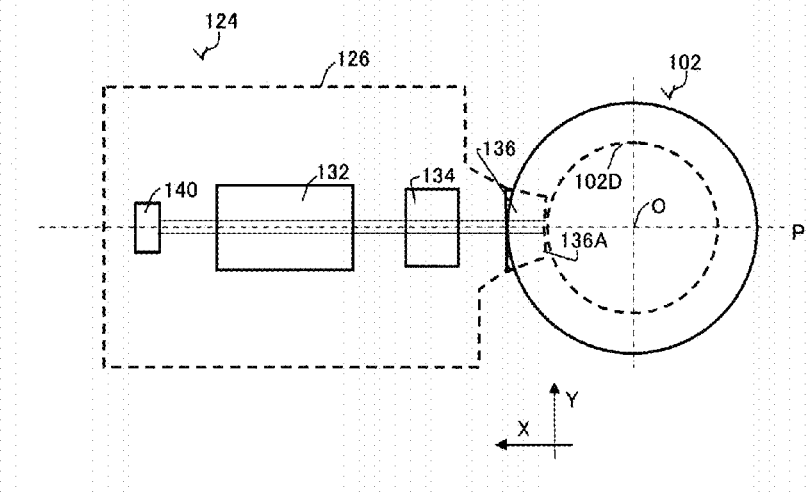
FIG. 2B is an upper view around the measuring probe in FIG. 1.

The measuring probe 124 includes a casing 126, a light source 128, a collimator lens 130, a beam splitter 132, a condensing lens 134, an objective lens 136, an isolator 138, and a line sensor (sensor) 140, as illustrated in FIG. 2A. A not-illustrated light shielding structure is appropriately provided with the casing 126 to prevent stray light, scattering light, and the like from an outside and the light source 128 from entering the line sensor 140. The casing 126 fixes the light source 128, the collimator lens 130, the beam splitter 132, the condensing lens 134, the objective lens 136, the isolator 138, and the line sensor 140. The light source 128 is a point-like light source such as a monochromatic LED. The wavelength of the light source 128 is preferably as long as possible (e.g., infrared light) from a viewpoint of detecting a shape error in comparison with an ideal shape (design shape) of the screw groove 102A, and this is not necessarily the case. The collimator lens 130 is an optical element configured to collimate light emitted from the light source 128. The beam splitter 132 is an optical element configured to reflect the collimated light passing through the collimator lens 130 in a direction toward the axial center O of the ball screw 102 (a direction of an optical axis P). The condensing lens 134 is an optical element configured to condense the collimated light reflected on the beam splitter 132 to emit light R0 from the light source 128 vertically to a surface 136A of the objective lens 136 provided subsequently to the condensing lens 134 and a specified area of the screw groove 102A.

The objective lens 136 is an approximately semi-circular cylindrical lens, as illustrated in FIGS. 2A, 2B, 3A, and 3B. The objective lens 136 is in a shape (design shape) corresponding to the screw groove 102A of the ball screw 102. That is, as illustrated in FIG. 3A, a lens upper surface 136B and a lens lower surface 136C of the objective lens 136 respectively correspond to the screw groove upper surface 102B and the screw groove lower surface 102C, and a cross-sectional shape of the surface 136A of the objective lens 136 is a shape where two arcs overlap with each other. The objective lens 136 is arranged to be opposed to the screw groove 102A in a non-contact manner (gap Gp) to enable the light R0 from the light source 128 to be emitted to the screw groove 102A, as illustrated in FIG. 3A.

As illustrated in FIG. 3A, the light R0 from the light source 128 is perpendicular to the surface 136A of the objective lens 136. Thus, the light R0 from the light source 128 is partially reflected on the surface 136A of the objective lens 136 and follows the incident path of the light R0 from the light source 128 in a reverse direction (reflected light R2). On the other hand, the light R0 from the light source 128 that has not been reflected on the surface 136A of the objective lens 136 is emitted vertically to the screw groove 102A. Thus, light reflected on the screw groove 102A (reflected light R1) also follows the incident path of the light R0 from the light source 128 in a reverse direction. That is, the light path difference between the reflected light R1 and the reflected light R2 is twice the gap Gp between the screw groove 102A and the surface 136A of the objective lens 136. The gap Gp can be less than 10 μm, for example. The objective lens 136 may be formed by means of molding, grinding, or polishing or directly by a 3D printer.

Figure 3B:
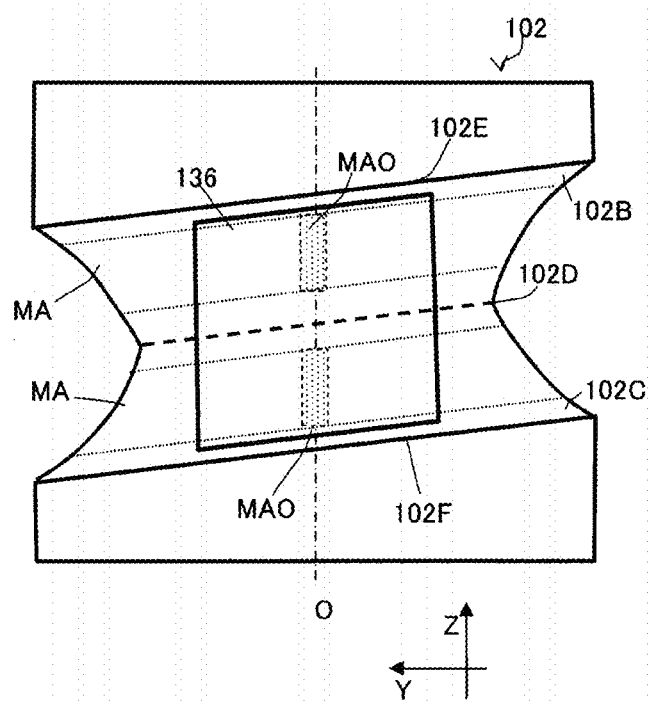
FIG. 3B is a front view illustrating the positional relationship between the objective lens and the ball screw in FIGS. 2A and 2B.

As illustrated in FIG. 3B, the light R0 for measuring the screw groove 102A is emitted to areas that the ball BL highly possibly contacts (measurement areas MAO) located between a screw groove center portion 102D and a screw groove upper end portion 102E on the screw groove upper surface 102B and between the screw groove center portion 102D and a screw groove lower end portion 102F on the screw groove lower surface 102C. The ball screw 102 is rotated against the measuring probe 124. Thus, by moving the measuring probe 124 in the Z direction along with rotation of the ball screw 102, the measuring probe 124 can continuously measure strip-like areas (measurement target areas MA) along leads of the screw groove 102A. Also, as illustrated in FIG. 2B, while the entire shape of the objective lens 136 is the approximately semi-circular shape, the surface 136A is formed to some extent in an arc along the screw groove center portion 102D in a planar view to an XY plane. Thus, a slightly wide-range area of the screw groove 102A in the Y direction can be a measurement target of the measuring probe 124.

The isolator 138 prevents reflection of light passing through both the collimator lens 130 and the beam splitter 132, and light reflected on the line sensor 140 to prevent ghost on the line sensor 140 and a decrease of an S/N ratio of an interference pattern, as illustrated in FIG. 2A.

The line sensor 140 detects an interference pattern generated by the reflected light R1 on the screw groove 102A passing through both the objective lens 136 and the beam splitter 132, and the reflected light R2 on the surface 136A of the objective lens 136, as illustrated in FIG. 2A. In the present embodiment, the line sensor 140 separately includes a line sensor 140A configured to measure a shape (posture) of the screw groove lower surface 102C and a line sensor 140B configured to measure a shape (posture) of the screw groove upper surface 102B. However, only one line sensor may be used to measure the shapes of the screw groove upper surface 102B and the screw groove lower surface 102C. The line sensor 140 includes a plurality of detection elements only in one line in a rotation shaft direction (direction of the axial center O of the rotation shaft 104) of the ball screw 102. Pixels of the detection elements are extremely narrow in the Z direction and extremely wide in the Y direction. Accordingly, the line sensor 140 can detect the interference pattern with a high contrast.

FIGS. 4A to 4D illustrate states of interference patterns detected by the line sensors 140A and 140B in a case in which positional relationship between the objective lens 136 and the screw groove 102A has changed.

As illustrated in FIG. 4A, in a case in which the shape of the screw groove 102A is equal to the design shape, the gap Gp between the screw groove 102A and the surface 136A of the objective lens 136 is constant at the measurement areas MAO. Thus, the interference pattern stripes are at regular intervals in the measurement areas MAO.

Conversely, as illustrated in FIG. 4B, in a case in which the diameter of the screw groove 102A deviates from the design shape (for example, in a case in which the diameter is large as illustrated by the hollow-centered arrow), the gap Gp between the screw groove 102A and the surface 136A of the objective lens 136 is not constant but changes in the measurement areas MAO. Thus, the interference pattern stripes are at irregular intervals in the measurement areas MAO. It is to be noted that the hollow-centered arrows on the lower stage in FIG. 4B represent expansion and contraction of the intervals of the interference pattern stripes.

Also, as illustrated in FIG. 4C, in a case in which a lead pitch of the screw groove 102A is shorter than the design shape, as illustrated by the hollow-centered arrow, the gap Gp between the screw groove upper surface 102B and the lens upper surface 136B of the objective lens 136 decreases while the gap Gp between the screw groove lower surface 102C and the lens lower surface 136C of the objective lens 136 increases. Thus, the interference pattern on the line sensor 140A moves to the lower side of the drawing sheet, and the phase changes. At the same time, the interference pattern on the line sensor 140B moves to the upper side of the drawing sheet, and the phase changes. It is to be noted that the hollow-centered arrows on the lower stage in FIG. 4C represent moving directions of the interference patterns.

Also, as illustrated in FIG. 4D, in a case in which a lead pitch of the screw groove 102A is longer than the design shape, as illustrated by the hollow-centered arrow, the gap Gp between the screw groove upper surface 102B and the lens upper surface 136B of the objective lens 136 increases while the gap Gp between the screw groove lower surface 102C and the lens lower surface 136C of the objective lens 136 decreases. Thus, the interference pattern on the line sensor 140A moves to the upper side of the drawing sheet, and the phase changes. At the same time, the interference pattern on the line sensor 140B moves to the lower side of the drawing sheet, and the phase changes. It is to be noted that the hollow-centered arrows on the lower stage in FIG. 4D represent moving directions of the interference patterns.

Meanwhile, as illustrated in FIG. 1, the measuring probe 124 is connected to the signal processing device 168. That is, the signal processing device 168 can analyze the interference pattern detected in the line sensor 140 and derive the shape of the screw groove 102A.

Next, a procedure for measuring the screw groove 102A performed by the measuring probe 124 will be described.

First, the ball screw 102 as a target to be measured is attached to the work support member 114 so as for the ball screw 102 to be rotatable around the rotation shaft 104. At this time, adjustment is performed so that the axial center O of the rotation shaft 104 may be equal to the axial center of the ball screw 102. Subsequently, with use of the probe support mechanism 142, the height of the measuring probe 124 is adjusted to the height of a measurement start position of the ball screw 102, and adjustment is performed so that the optical axis P of the measuring probe 124 may intersect with the axial center O. The angle of the ball screw 102 is then adjusted with use of the rotation mechanism 108 so that the screw groove 102A may be located on the optical axis P of the measuring probe 124. Positional adjustment of the measuring probe 124 in the X direction is then performed with use of the adjustment stage 144 of the probe support mechanism 142 so that the objective lens 136 of the measuring probe 124 and the screw groove 102A may have an appropriate gap Gp therebetween.

Subsequently, by means of an instruction from an input device (not illustrated), a measuring program for the screw groove 102A is started in the signal processing device 168. Thus, at the same time as the ball screw 102 is rotated at predetermined speed, the height of the measuring probe 124 is changed. The objective lens 136 of the measuring probe 124 is set in a state of being opposed to the screw groove 102A at all times. Detection signals are output in real time from the measuring probe 124, and the output signals are processed in the signal processing device 168. Meanwhile, this processing may be performed at the same time as the control or after the end of the control.

Measurement of the ball screw 102 is terminated by the end of the measuring program or an instruction from the input device.

In this manner, in the present embodiment, the objective lens 136 is formed to correspond to the screw groove 102A, is arranged to be opposed to the screw groove 102A in a non-contact manner, and emits the light R0 from the light source 128 to the screw groove 102A. The line sensor 140 then detects the interference pattern of the reflected light R1 from the screw groove 102A and the reflected light R2 from the surface 136A of the objective lens 136. That is, the present embodiment employs a configuration in which the line sensor 140 detects the interference pattern generated by a light path difference based on the gap Gp between the objective lens 136 and the screw groove 102A. Accordingly, by processing an output of the line sensor 140 in the signal processing device 168, the measurement target area MA of the screw groove 102A for the objective lens 136 to which the light R0 from the light source 128 is emitted can be specified, and a shape of the measurement target area MA can be measured.

Also, in the present embodiment, the screw groove 102A can be measured in a non-contact manner. Thus, the shape of the measurement target area (specified area) MA including not only a relatively projected "point" in the screw groove 102A but also a recessed area around the point can be measured. Also, since the measuring probe 124 is not configured to move by contacting the ball screw 102, movement of the measuring probe 124 does not depend on the actual lead pitch of the screw groove 102A. Thus, in the present embodiment, changes in diameter of the ball screw 102, changes in lead pitch, and the like as illustrated in FIGS. 4B to 4D can be measured. That is, shape errors of the screw groove 102A of the ball screw 102 (a lead pitch error, a lead irregularity, and the like) can be measured.

Also, in the present embodiment, the objective lens 136 can measure both shapes of the screw groove upper surface 102B and the screw groove lower surface 102C of the screw groove 102A at the same time. Thus, positional adjustment of the objective lens 136 against the screw groove 102A is easy, and measurement can be highly accurate. Also, since both the shapes of the screw groove upper surface 102B and the screw groove lower surface 102C can be compared and examined at the same time, features of forming of the screw groove 102A can be found easily. Further, measurement can be performed more promptly than in a case of measuring the screw groove upper surface 102B and the screw groove lower surface 102C separately. Meanwhile, the present invention is not limited to this and may employ a configuration of the objective lens in which only either the screw groove upper surface or the screw groove lower surface of the screw groove is measured.

Also, in the present embodiment, using the line sensor 140 can shorten time per scan further than using an area sensor and can improve the resolution. Thus, time required for measurement can drastically be shortened with high resolution. Meanwhile, the present invention is not limited to this and may use an area sensor without using the line sensor or may move a single detection element so as for the detection element to work instead of the line sensor.

Also, in the present embodiment, the signal processing device 168 arranged outside the measuring probe 124 processes the output of the line sensor 140 and derives the shape of the screw groove 102A. Thus, the measuring probe 124 itself can be reduced in size and weight. Since this signal processing device 168 also controls the entire system, efficiency of components involved with processing can be improved. Meanwhile, the present invention is not limited to this, and a calculation part for analyzing the interference pattern detected in the line sensor and deriving the shape of the screw groove may be incorporated into the measuring probe.

That is, in the present embodiment, it is possible to measure a specified area (measurement target area MA) of the relatively movable screw groove 102A in a non-contact manner with high accuracy.

Although the present invention has been described, taking the first embodiment as an example, the present invention is not limited to the above embodiment. That is, it is to be understood that the present invention can be altered and modified in design without departing from the scope of the present invention.

For example, although the isolator 138 is used in the measuring probe 124 in the first embodiment, the present invention is not limited to this. For example, a second embodiment illustrated in FIG. 6A may be employed. Since the second embodiment has a configuration of the first embodiment from which the isolator has been eliminated, the first digits of the reference signs are just changed, and detailed description of the second embodiment will be omitted. Accordingly, in the present embodiment, a measuring probe 224 can be reduced in size, weight, and cost further than in the first embodiment.

Alternatively, a third embodiment illustrated in FIG. 6B may be employed. Since the third embodiment has a configuration of the first embodiment including a condensing lens 337 and a reference lens 338 instead of the isolator 138, the first digits of the reference signs are just changed, and description of the third embodiment except the condensing lens 337 and the reference lens 338 will basically be omitted.

As illustrated in FIG. 6B, the condensing lens 337 has an equal shape to that of a condensing lens 334, and is arranged to have an equal light path length to that of the condensing lens 334 for light from a light source 328 passing through a beam splitter 332. Also, the reference lens 338 has an equal shape to that of an objective lens 336, and is arranged to have an equal light path length to that of the objective lens 336 for light from the light source 328 passing through both the beam splitter 332 and the condensing lens 337. That is, by arranging the condensing lens 337 and the reference lens 338, the amount of light having an equal light path length to that of the reflected light from the surface of the objective lens 336 is increased, which causes a high contrast of the interference pattern generated by the reflected light from the surface of the objective lens 336 to be achieved. Thus, the interference pattern can be detected at the line sensor 340 with a higher contrast than in the above embodiments. That is, the shape of a screw groove 302A can be measured more accurately than in the above embodiments.

Also, although, in the second embodiment, an incident angle of light to an objective lens 236 is defined by a condensing lens 234, the present invention is not limited to this. For example, a fourth embodiment illustrated in FIG. 6C may be employed. Since the fourth embodiment has a configuration of the second embodiment including a diffraction grating 434 instead of the condensing lens 234, the first digits of the reference signs are just changed, and description of the fourth embodiment except the diffraction grating 434 will basically be omitted.

As illustrated in FIG. 6C, the diffraction grating 434 is formed in a flat plate shape and is a double diffraction grating, for example. Thus, in the present embodiment, positional adjustment of the diffraction grating 434 is easier than that in the case of using the condensing lens, and a measuring probe 424 can be reduced in size and weight.

Figure 7A:
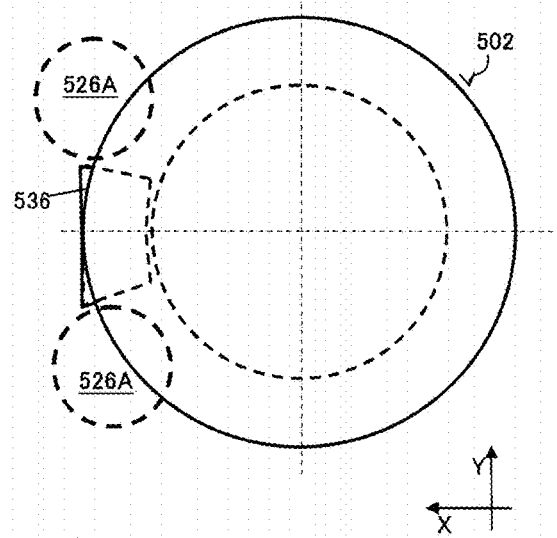
FIG. 7A is an upper view illustrating relationship between a tip end of a measuring probe according to a fifth embodiment of the present invention and a ball screw, and each of FIGS. 7B and 7C is a side view illustrating the relationship between the tip end of the measuring probe according to the fifth embodiment of the present invention and the ball screw.
Figure 7B:
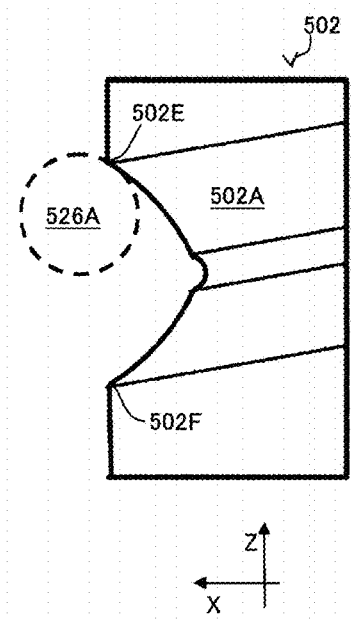
Figure 7C:
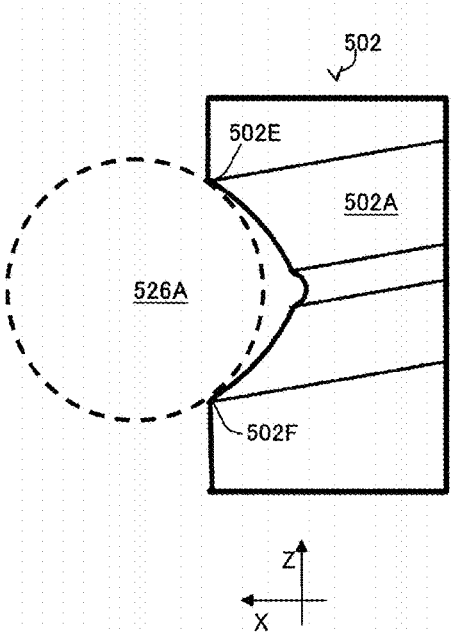

Also, although, in the above embodiments, movement of the measuring probe in the Z direction is driven and controlled by the Z stage, the present invention is not limited to this. For example, a fifth embodiment illustrated in FIGS. 7A to 7C may be employed. Since the fifth embodiment differs from the above embodiments just in terms of a configuration of a tip end of the measuring probe, the first digits of the reference signs are just changed, and description of the fifth embodiment except the configuration of the tip end of the measuring probe will basically be omitted.

In the present embodiment, a Z stage (not illustrated) just works as a movement guide of the measuring probe. At the tip end of the measuring probe, a pair of ball bearings (sliding members) 526A is fixed in a casing (not illustrated) with an objective lens 536 interposed therebetween. Each of the ball bearings 526A as a pair contacts an end portion of a screw groove 502A (for example, a screw groove upper end portion 502E in FIG. 7B or the screw groove upper end portion 502E and a screw groove lower end portion 502F in FIG. 7C) (that is, the measuring probe includes the pair of ball bearings 526A contacting the screw groove 502A). Thus, rotation of a ball screw 502 causes movement of the screw groove 502A in the Z direction, which causes movement of the measuring probe in the Z direction. Accordingly, in the present embodiment, since the Z stage dispenses with a driving source, and control thereof is not required, the system itself can be reduced in cost.

Also, although, in the above embodiments, the work is the ball screw, the present invention is not limited to this. For example, a sixth embodiment illustrated in FIG. 8 may be employed. Since the sixth embodiment differs from the first embodiment just in terms of a work, the first digits of the reference signs are just changed, and description of the sixth embodiment except a configuration relating to the work will basically be omitted.

In the present embodiment, the work is a cylindrical cam 602, for example. In the present embodiment, the cylindrical cam 602 is formed in a cylindrical shape and is provided on a side surface thereof with a cam groove having an approximately V-shaped cross-section (may be an approximately trapezoidal cross-section). The objective lens is formed to correspond to the cam groove, is arranged to be opposed to the cam groove in a non-contact manner, and can emit light from the light source to (upper and lower surfaces of) the cam groove. Thus, in the present embodiment, the shape(s) of (the upper and lower surfaces of) the cam groove can be measured.

Alternatively, the work may not be a rotating body but be a flat body provided with an approximately V-shaped groove on an equal plane, and the flat body may be movable relatively to the measuring probe.

Also, although, in the above embodiments, the work is rotated against the measuring probe by the rotation mechanism, the present invention is not limited to this. The work may be fixed, and the measuring probe may be rotated around the work. In any case, the work has only to be rotatable relatively to the measuring probe.

Also, although, in the above embodiments, the measuring probe is constituted by optical elements such as the beam splitter, the collimator lens, and the condensing lens, the present invention is not limited to this. These optical elements can be changed or omitted as needed.

The present invention can widely be applied to a measuring probe for measuring a shape of a side surface of a relatively movable work.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A measuring probe for measuring a screw groove of a screw that is capable of rotation relative to the measuring probe, comprising:
    a light source;
    an objective lens formed to correspond to the shape of the screw groove, arranged to be opposed to the screw groove in a non-contact manner, and configured to emit light from the light source to the screw groove;
    a sensor configured to detect an interference pattern generated by reflected light from the screw groove and reflected light on a surface of a screw groove side of the objective lens;
    a collimator lens configured to collimate light emitted from the light source;
    a beam splitter configured to reflect the collimated light passing through the collimator lens in a direction towards the screw groove; and
    an optical element configured to condense the collimated light reflected on the beam splitter to emit light from the light source vertically to the surface of the objective lens and the screw groove,
    wherein a cross-sectional shape of the objective lens is a shape where arcs of two circles overlap with each other, and the light from the light source is partially reflected on the surface of the screw groove side of the objective lens and follows an incident path of the light from the light source in a reverse direction, and the light from the light source that has not been reflected on the surface of the screw groove side of the objective lens is emitted vertically to the screw groove and, a light reflected on the screw groove also follows the incident path of the light from the light source in a reverse direction, and the light path difference between the reflected light from the screw groove and the reflected light from the surface of the screw groove side of the objective lens is twice the gap between the screw groove and the surface of the screw groove side of the objective lens.

2. The measuring probe according to claim 1, wherein the surface of the objective lens is formed in an arc along a screw groove center portion of the screw groove in a planar view.

3. The measuring probe according to claim 1, wherein the sensor is a line sensor including a plurality of detection elements with one line in a rotation shaft direction of the screw.

4. The measuring probe according to claim 1, further comprising an isolator configured to prevent reflection to light passing through both the collimator lens and the beam splitter, and light reflected on the sensor.

5. The measuring probe according to claim 1, further comprising a ball bearing configured to contact the screw groove, wherein the ball bearing has a pair of pieces, and the pieces are arranged to interpose the objective lens there between.

6. A measuring probe system including the measuring probe according to claim 1, comprising:
    a processor configured to analyze the interference pattern detected in the sensor and derive the shape of the screw groove.

* * * * *